United States Patent
Sakatani et al.

(10) Patent No.: US 6,827,495 B2
(45) Date of Patent: Dec. 7, 2004

(54) FLUID BEARING DEVICE

(75) Inventors: Ikunori Sakatani, Kanagawa-ken (JP); Yukio Higuchi, Kanagawa-ken (JP); Nobuyuki Hagiwara, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/369,757

(22) Filed: Feb. 21, 2003

(65) Prior Publication Data

US 2004/0028298 A1 Feb. 12, 2004

Related U.S. Application Data

(63) Continuation of application No. 09/818,945, filed on Mar. 28, 2001, now abandoned.

(30) Foreign Application Priority Data

Mar. 29, 2000 (JP) ........................................ 2000-092124
Apr. 19, 2000 (JP) ........................................ 2000-117319

(51) Int. Cl.⁷ .............................................. F16C 32/06
(52) U.S. Cl. ...................................... 384/124; 112/113
(58) Field of Search ................................. 384/124, 112, 384/113

(56) References Cited

U.S. PATENT DOCUMENTS

| | | | |
|---|---|---|---|
| 5,357,163 A | 10/1994 | Minakuchi et al. | ........... 310/97 |
| 5,876,124 A | 3/1999 | Zang et al. | ................. 384/107 |
| 5,901,013 A | 5/1999 | Lee et al. | |
| 6,196,722 B1 | 3/2001 | Asada et al. | |
| 6,271,612 B1 | 8/2001 | Tanaka et al. | |
| 6,357,916 B2 | 3/2002 | Saeki et al. | |
| 6,371,650 B1 | 4/2002 | Goto et al. | |

*Primary Examiner*—Matthew C. Graham
(74) *Attorney, Agent, or Firm*—Crowell & Moring LLP

(57) ABSTRACT

A spindle motor comprises a hollow shaft 13 having one end formed with a thrust plate 15, and a sleeve 12 provided to face the shaft 13 through a radial fluid bearing clearance R therebetween, wherein a thrust fluid bearing S is formed between the opposite flat surfaces 15s of the thrust plate 15 and the sleeve 12 facing the flat surfaces 15s. In addition, the hollow shaft 13 has a connection portion 30 at the lower end formed in a concave shape, such that the thrust plate 15 is guided by the inner peripheral surface of the connection portion 30 such that it is coaxial with the shaft 15, and fixed to the shaft 13 by fitting the cylindrical portion 20b of a set screw 20 to the through hole 15b of the thrust plate 15 and the connection portion 30.

4 Claims, 2 Drawing Sheets

FLUID BEARING DEVICE

FIELD OF THE INVENTION

This invention relates to a fluid bearing device for information equipment, audio/video equipment, office equipment and the like, and more particularly to a fluid bearing device that is best suited for a magnetic disk device (HDD) that are used in a notebook type personal computer, optical disk device, or fan motor etc.

DESCRIPTION OF THE RELATED ART

An example of a prior fluid bearing device of this type is the HDD spindle motor shown in FIG. 2.

In this fluid bearing device, a sleeve 2 made of free-cutting brass is fastened to a cylindrical section 1a that is fixed upright to a base 1, and a shaft 3 made of stainless steel passes through this sleeve 2 such that it rotates freely. On the top end of this shaft 3 there is a hub 4 that is formed in an inverted cup shape and integrally attached to the shaft 3, and a dynamic fluid bearing is located between this shaft 3 and sleeve 2. A plurality of magnetic disks are placed at intervals in the axial direction on the outer peripheral surface of the hub 4.

A thrust plate 5 made of stainless steel in a disk shape is fastened on the bottom end of the shaft 3, and both of the flat surfaces of this thrust plate 5 are the thrust receiving surfaces 5s of the thrust fluid bearing S. And, on the bottom end surface of the sleeve 2, that is a mating member, faces the thrust receiving surface 5s on the top surface side of the thrust plate 5, and this bottom end surface of the sleeve 2 is a thrust bearing surface 2s of the thrust fluid bearing S.

Moreover, below the thrust plate 5, there is another mating member, that is counter plate 6, which is made of free-cutting brass and fastened to the base 1. The top surface of this counter plate 6 faces the thrust-receiving surface 5s on the bottom side of the thrust plate 5, and it forms the thrust-bearing surface 6s of the thrust fluid bearing S. Of the aforementioned thrust-receiving surfaces 5s and thrust-bearing surfaces 2s, 6s, at least the thrust-receiving surfaces 5s are formed with herring-bone-shaped or spiral-shaped grooves (not shown in the figure) for producing dynamic pressure, that are formed by etching, to form the thrust fluid bearing S.

Furthermore, a pair of radial-receiving surfaces 3r are formed on the outer peripheral surface of the shaft 3 with an interval in the bottom and top direction. Also, a pair of radial bearing surfaces 2r are formed on the inner peripheral surface of the sleeve 2 such that they face the radial-receiving surfaces 3r, respectively. In at least one of the pairs, the radial-receiving surfaces 3r, or radial bearing surfaces 2r, there are, for example, herring-bone-shaped grooves 7 for generating dynamic pressure, thereby forming radial fluid bearings R, respectively.

There is also a stator 8 fastened around the outer periphery of the cylindrical section 1a, and it faces the surface of the rotor magnet 9, that is fastened on the bottom side to the inner peripheral surface of the hub 4, by way of a gap therebetween to form the drive motor M, and the shaft 3 and hub 4 are rotated and driven together as one member.

As the shaft 3 rotates, a pumping action occurs in the grooves for generating dynamic pressure in both the thrust fluid bearing S and radial fluid bearing R, and dynamic pressure is generated on the lubrication oil in the bearing gaps of the fluid bearings S and R, and the shaft 3 is supported by but not in contact with the sleeve 2 and counter plate 6.

It is desired that HDD for recent notebook type personal computers, be thin as well as strong enough to withstand external impacts that could be applied during shipping or handling. In addition, it is also desired that they be low cost and durable.

As the HDD becomes thinner, there is a trend that the height of the fluid bearing device (spindle motor) used in the HDD becomes smaller, so it is necessary to increase the load capability for moment loads that act on the fluid bearing when swung. Therefore, it is necessary to design a larger bearing span for the plurality of radial bearings, however, since the height of the device is limited (for example 9.5 mm or less), it is necessary to decrease the thickness of the thrust plate.

However, when the thrust plate 5 is press fitted on the shaft 3 (shaft diameter is approximately 2.5 to 3.5 mm), a push-out force that is capable of withstanding an external impact of e.g. 1000G is necessary. However, since it is not possible to apply interference that would occur when performing press fitting with a stress that is greater than the yield stress of the material of the thrust plate 5, or interference that would have adverse effects on the flatness of both surfaces (thrust-receiving surfaces 5s) of the thrust plate 5, it is necessary that the thickness be 2 mm or greater even when the material of the thrust plate 5 is stainless steel, and since it is not possible to design a large bearing span at this thickness, it is difficult to increase the load capability for moment loads.

When the aforementioned interference is large, there is a possibility that the thrust plate 5 will be deformed during press fitting. This deformation is a bulging (convex deformation) in the center of the thrust plate 5, that is a portion formed with a hole for fitting on the shaft 3, which decreases the flatness of both surfaces of the thrust plate 5.

Moreover, as the thickness of the thrust plate 5 becomes thin, the portion that comes in contact with the outer peripheral surface of the shaft 3 in a fitting relationship becomes small (the length in the axial direction becomes shorter), so that it becomes easy for run out of the end surface (flat surface) of the thrust plate 5 to be large with respect to the center axis, and often it is not possible to satisfy the condition required for the bearing performance that the ran out of the end surface the no more than 2 $\mu$m.

In other words, it is difficult to make the thickness of the thrust plate thinner in order to increase the load capability for moment loads, as well as satisfy the conditions required for the thrust plate such as the push-out force, flatness, and end surface run out.

On the other hand, in order to secure the reliability of the spindle motor operation, any contact between the outer peripheral surface 5a of the thrust plate 5 and the portion of the cylindrical section 1a that faces the outer peripheral surface 5a must be avoided, and in order to do that, the thrust plate 5 must be installed such that it is highly coaxial with the shaft 3. Particularly, in the case of a spindle motor of the fixed-sleeve, rotating-shaft type, any changes in the clearance between the outer peripheral surface 5a of the thrust plate 5 and the portion of the cylindrical section 1a that faces the outer peripheral surface 5a during rotation would cause unstable run out, and therefore it is extremely important that the thrust plate 5 is highly coaxial with the shaft 3.

Furthermore, when etching is adopted to form grooves in the thrust plate 5 for generating dynamic pressure, there is a problem of increased cost.

SUMMARY OF THE INVENTION

This invention is made to solve the problems with this kind of prior fluid bearing, and to provide a fluid bearing with high load capability for moment loads that would occur when the bearing device is swung even when the height dimension is limited, and in a low cost and with good operating reliability.

PREFERRED EMBODIMENTS OF THE INVENTION

Figure 1:
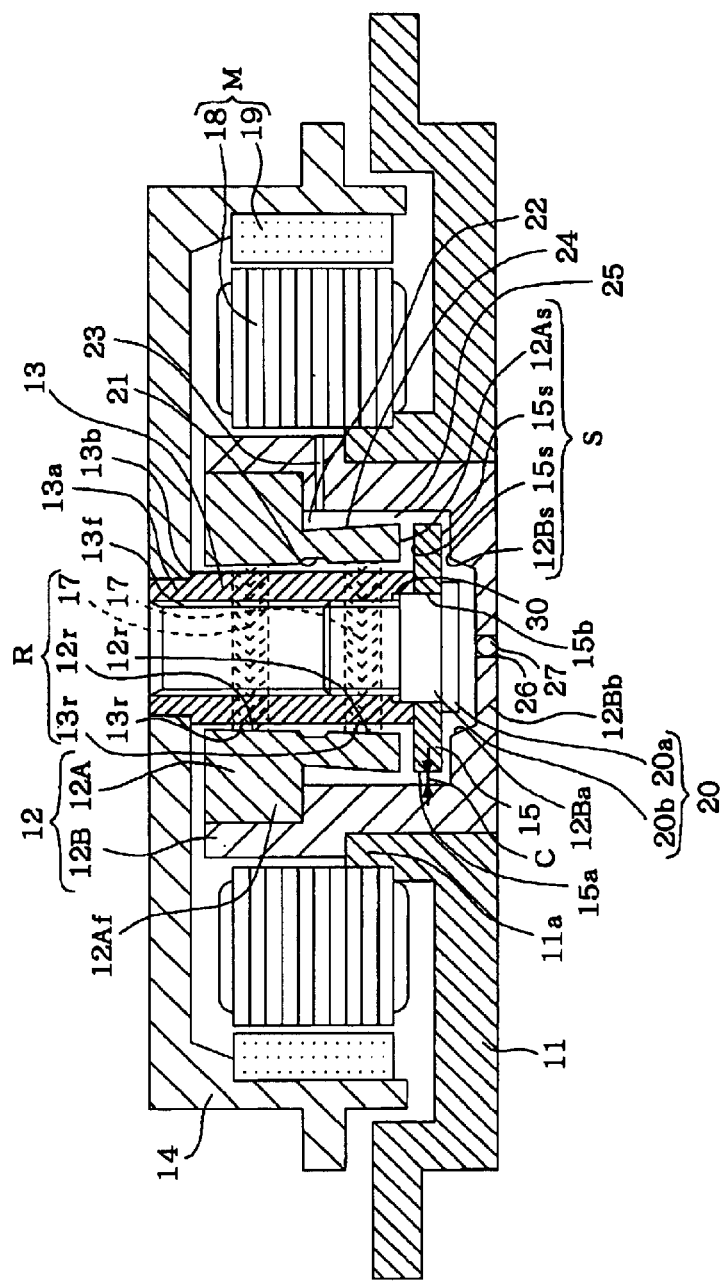
FIG. 1 is a longitudinal cross sectional view of a construction of the spindle motor in one embodiment of the fluid bearing device according to the present invention.

The fluid bearing device according to one feature of this invention comprises a hollow shaft having a thrust plate on one end, and a sleeve that faces the shaft through a radial fluid bearing clearance, where the thrust plate provides a thrust fluid bearing that is formed between at least one of the opposite flat surfaces of the thrust plate and a mating member opposed to the at least one flat surface, and where the aforementioned thrust plate is guided coaxial with reference to the shaft by the a concave-shaped or convex-shaped connection portion formed on one end of the shaft, and is fastened by way of screw tightening to a threaded hole extending through the shaft.

With this kind of construction, it is possible to join the shaft and thrust plate such that they are highly coaxial with each other for good bearing performance, so that even when the clearance between the outer peripheral surface of the thrust plate and the member that faces that outer peripheral surface of the thrust plate is small, no contact would occur between the outer peripheral surface and the member that faces the outer peripheral surface, and thus operating reliability of the fluid bearing device is high.

Moreover, the flat surface of the thrust plate is abutted to the bottom end surface of the shaft, and the thrust plate is guided by the convex-shaped or concave-shaped connection portion formed on one end of the shaft, so that it is coaxial with the shaft. Accordingly even though the thickness of the thrust plate is thin, the run out of the flat end surface of the thrust plate with respect to the center axis is small.

Furthermore, the thrust plate is fastened through screw tightening to the threaded hole extending through the shaft, so that even though the thickness of the thrust plate is thin and the interference is small, it is fastened with enough strength (push-out force) to withstand impact.

In addition, the threaded hole extending through the shaft functions as the thread hole for clamping to fix the magnetic disk to the hub.

It is best for the clearance between the outer peripheral surface of the thrust plate and the member that faces this outer peripheral surface to be 50 to 300 $\mu$m. When this clearance is 50 $\mu$m or greater, the possibility of contact between the outer peripheral surface of the thrust plate and the member that faces this outer peripheral surface is low even when the shaft and flange section are connected to each other with somewhat low concentricity. Also, when the clearance is up to 300 $\mu$m, there is little possibility that air bubbles will remain in the clearance when assembling the fluid bearing device. In order to further improve these characteristics, it is even better for the clearance to be 100 to 200 $\mu$m.

Moreover, it is best for the thickness of the thrust plate to be 1.5 mm or less. In this case, it is possible to design a radial fluid bearing with a large bearing span even though there is limited height dimension, and it is possible to increase the load capability for moment loading that would occur when the bearing device is swung. When the thickness of the thrust plate is greater than 1.5 mm, it is not possible to design a large bearing span, and the load capability for moment loading is not sufficient when the bearing device is swung.

Furthermore, in the case of the fluid bearing device according to another feature of this invention, the thrust plate of the fluid bearing device as in the first feature is disk shaped with a hole in the center and has a thickness of 1.5 mm or less, and the grooves for generating dynamic pressure are formed on both flat surfaces by plastic working, specifically coining process to have a depth of 12 $\mu$m or less.

With this kind of construction, the grooves for generating dynamic pressure are formed on the thrust plate by a coining process which is lower cost and better for mass production than an etching process, so that the cost of the fluid bearing device is lower. In the coining process, a press or the like is used to press a die, which is formed in advance with grooves for generating dynamic pressure, against the thrust plate.

When processing both flat surfaces of the thrust plate with this kind of coining process to form grooves, for example, in 12 $\mu$m depth for generating dynamic pressure, if the thickness of the thrust plate is greater than 2 mm, the grooves cannot be formed without increasing the pressure load to increase the amount of swaging, so as a result, the variation in groove depth increases and exceeds 4 $\mu$m.

In this regard, when the thickness of the thrust plate is 1.5 mm or less, and the grooves for generating dynamic pressure are coined to a groove depth of 12 $\mu$m or less, the swaging amount is so small that it is possible to keep the variation in groove depth to 4 $\mu$m or less.

Furthermore, when the thickness of the flange section is 1 $\mu$mm or less, it is possible to reduce the amount of swaging even further, so that it is possible to keep the variation of groove depth to 3 $\mu$m or less.

For better fluid bearing performance, since it is best for the variation in groove depth to be kept 4 $\mu$m or less, it is best for the thickness of the thrust plate to be 1.5 mm or less.

Figure 2:
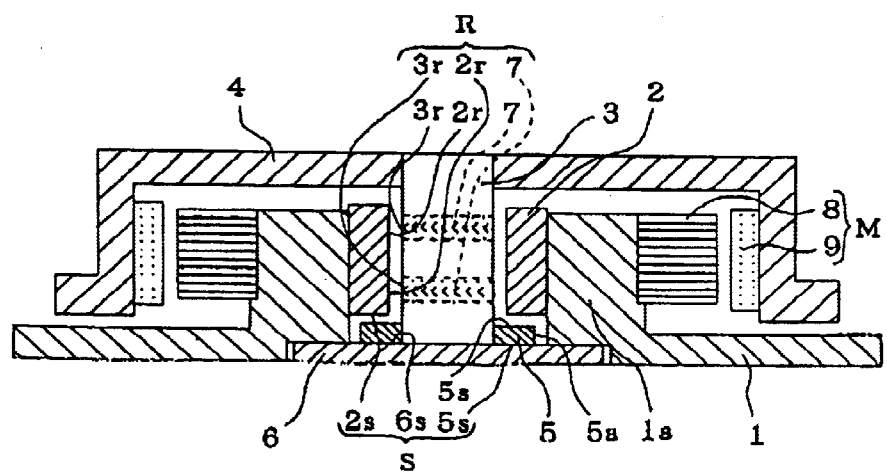
FIG. 2 is a longitudinal cross sectional view of a construction of the prior art spindle motor.

On the other hand, as shown in FIG. 2, when the thickness of the thrust plate is 2 mm or less, it is not possible to secure a push-out force that the will withstand impact by just press fitting the flange onto the shaft. Therefore, by fastening the thrust plate to the shaft by way of screw tightening in the threaded through hole formed in the center portion of the thrust plate, it is possible to secure the required push-out force even when the thickness of the thrust plate is thin. When the thrust plate is fastened to the shaft with a screw, there is no interference control such as in press fitting, so that reliability of the clamping connection is increased.

A preferred embodiment of the fluid bearing device of this invention is explained in detail with reference to the drawings. FIG. 1 is a vertical cross-sectional view of the spindle motor construction of the embodiment of the invention.

A cylindrical sleeve 12 is inserted into a cylindrical section 11a, that is formed upright in the center of a base 11, and they are fastened to form a single member. This sleeve 12 has a dual structure comprising an inner sleeve 12A and outer sleeve 12B, which are fastened together to form a single member. In other words, the outer sleeve 12B is cylindrical having a bottom plate 12Bb, and the bottom surface of the bottom plate 12Bb is at nearly the same height as the base 11, and fits inside the cylindrical section 11a.

Moreover, the inner sleeve 12A is cylindrical having a flange 12Af, and the flange 12Af is fastened to the inner peripheral surface of the upper portion of the outer sleeve 12B, and this forms a circular clearance or reservoir 22 for lubricant between the outer peripheral surface of the inner sleeve 12A and the inner peripheral surface of the outer sleeve 12B. There is an air escape hole 23 formed at the top of this lubricant reservoir 22 and open to the outside air. This air escape hole 23 extends horizontally from the top of the lubricant reservoir 22 to open in the outer peripheral surface of the outer sleeve 12B. The construction of this lubricant reservoir 22 is described later in more detail.

The sleeve 12 can be made from a copper alloy such as free cutting brass, lead bronze alloy casting, phosphor bronze alloy, aluminum bronze alloy, high-strength brass or beryllium copper alloy.

A hollow shaft 13 having a threaded through hole is inserted through the sleeve 12, and female screw threads 13f are formed around the inner peripheral surface of the shaft 13.

Also, the material of shaft 13 is not limited as long as it is hard and can withstand corrosion, for example, a martensite stainless steel, or austenite stainless steel that has been heat treated to harden the surface, or that has been surface treated with plating or DLC (diamond-like carbon) to harden the surface.

The diameter of the upper end section 13a of this shaft 13 is smaller than that of the other section, and this upper end section 13a with small-diameter is press fitted into a hole that is formed in the center of a shallow, inverse-cup-shaped hub 14 in order to integrally fasten the shaft 13 to the hub 14.

The other section with large-diameter has its top surface 13b formed at the border between the upper end section 13a with small-diameter and the other section with large-diameter, and the bottom surface of the hub 14 comes in contact with the top surface 13b of the other section with large-diameter, so that the shaft 13 and hub 14 are fastened together with enough strength to sufficiently withstand impact.

In addition, the threaded through hole in the shaft 13 functions as the thread hole for clamping to fix the magnetic disk to the hub.

On the bottom end of the shaft 13 in the section that protrudes from the bottom end of the inner sleeve 12A, there is a disk-shaped thrust plate 15 having a through hole 15b in the center, and it is fastened to the shaft 13 by a set screw 20 that screws into the female screw 13f on the inner peripheral surface of the shaft 13, and the shaft 13 and thrust plate 15 are fastened together with enough strength (push-out force) to sufficiently withstand impact. This thrust plate 15 is constructed of a copper alloy or stainless steel, and it is 1.5 mm thick or less. Of course, it is desirable that the thrust plate 15 be made of a copper alloy, such that it has excellent machinability.

The shape of the head 20a of the set screw 20 is not limited to a flat head as shown in the figure, but can have a rounded head like a round-headed screw or a countersunk head like a countersunk screw. However, when the set screw 20 is a countersunk screw, the inner peripheral surface of the through hole 15b in the thrust plate 15 must be tapered, so in comparison with other types of screws, mass productivity drops a little.

Here, fastening the thrust plate 15 to the shaft 13 is explained in detail.

On the bottom surface of the hollow shaft 13, there is a concave section or connection portion 30 that has a larger diameter than the inner diameter of the hollow shaft 13, and the set screw 20 comprises a cylindrical section 20b that is between the head 20a and the tip portion with the male threads, and both the connection portion 30 and the cylindrical section 20b have nearly the same diameter as the through hole 15b that is formed in the center of the thrust plate 15 and through which the set screw 20 is inserted.

The cylindrical section 20b fits inside the through hole 15b and the concave-shaped connection portion 30, so that the thrust plate 15 is connected to the shaft 13. Accordingly, the inner peripheral surface of the connection portion 30 acts as a guiding surface for guiding the thrust plate 15 by way of the cylindrical section 20b of the set screw 20 such that it is coaxial with the shaft 13, and the thrust plate 15 is fastened to the shaft 13 such that the concentricity (degree of being coaxial) is 50 $\mu$m or less.

Moreover, the thrust plate 15 is fastened to the shaft 13 with the top surface of the thrust plate 15 in contact with the bottom end surface of the shaft 13, so that the run out of the end surface of the thrust plate 15 is small even when the thickness of the thrust plate 15 is thin.

The clearance C that is formed between the outer peripheral surface 15a of the thrust plate 15 and the inner peripheral surface of the outer sleeve 12B that faces the outer peripheral surface 15a is designed be 50 to 300 $\mu$m, and preferably 100 to 200 $\mu$m. Accordingly, when the aforementioned concentricity (degree of being coaxial) exceeds 50 $\mu$m, there is a possibility that the outer peripheral surface 15a of the thrust plate 15 and the inner peripheral surface of the outer sleeve 12B will come in contact with each other while the thrust plate 15 is rotating.

For the spindle motor of the fixed-sleeve, rotating-shaft type, as in the case of this embodiment, when the concentricity on the rotating side is greater than 50 $\mu$m, there is a possibility that unstable run out will occur due to large variations in the clearance C during rotation.

If this clearance C is small, when grooves for generating dynamic pressure are formed in the flat surfaces of the thrust plate 15 by plastic working, specifically coining, a problem exists in that it is difficult to secure processing precision of the outer peripheral surface 15a. On the other hand, when the clearance C is large, there is a problem in that it is easy for air bubbles to remain in the clearance C when assembling the bearing. Accordingly, the clearance C must be 50 to 300 $\mu$m, and preferably 100 to 200 $\mu$m.

In the fluid bearing device of this embodiment of the invention, the thickness of the thrust plate 15 is 1.5 mm or less, so that although the height of the bearing device is limited, it is possible to design a large bearing span between the radial fluid bearings R that are described later, therefore the capability for withstanding moment loads is high when the bearing device is swung.

However, when the thickness of the thrust plate 15 is less than 2.0 mm, there is a possibility that a push-out force for withstanding impact may not be secured by just press fitting the thrust plate 15 onto the shaft 13 as in the prior example shown in FIG. 2, in other words, it is not possible to increase the push-out force by just press fitting even though the interference is increased greater than the yield strength of the material (stainless steel or copper alloy) of the thrust plate 15.

Moreover, when the interference between the thrust plate 15 and shaft 13 is greater than 10 $\mu$m, there is the problem that the thrust plate 15 may deform during press fitting. This deformation is in the form of an approximately 3 $\mu$m convex protrusion of the center section (section where the through hole 15b for press fitting onto the shaft 13 is formed) of the thrust plate 15, and causes both flat surfaces (receiving surfaces 15s of the thrust fluid bearing S to be described later) to curve.

In this embodiment, the thrust plate 15 and shaft 13 are fastened by way of screw tightening, so that the problem described above does not occur, and that the required push-out force is secured.

The bottom surface of this thrust plate 15 faces the top surface of the bottom plate 12Bb of the outer sleeve 12B which is a mating member and acts as a counter plate, and when the bearing device is not in operation, the opposing surfaces come in contact with each other.

There is a concave section 12Ba formed in the center (position directly below the shaft 13) of the top surface of the bottom plate 12Bb for storing the head 20a of the set screw 20. This does away with the need to embed the set screw 20 into the thrust plate 15 when installing, thus processing of the thrust plate 15 becomes simple.

Also, the top surface of the thrust plate 15 faces the bottom end surface of the other mating member or inner sleeve 12A.

Both the top and bottom flat surfaces of the thrust plate 15 are thrust receiving surfaces 15s. Moreover, the lower end surface of the mating member or inner sleeve 12A which faces the upper thrust receiving surface 15s is the thrust bearing surface 12As, and the top surface of the other mating member or bottom plate 12Bb of the outer sleeve 12B which faces the lower thrust receiving surface 15s, is the thrust bearing surface 12Bs, and furthermore, the thrust receiving surfaces 15s are formed, for example, with herring-bone-shaped grooves for generating dynamic pressure (not shown in the figure), to form a thrust fluid bearing S.

The grooves for generating dynamic pressure that are formed on both flat surfaces (thrust-receiving surfaces 15s) of the thrust plate 15 are formed by plastic working, specifically coining process. The coining process is a method of making grooves by using a press etc. to press a die onto the thrust plate 15, so when compared with an etching process, it is lower in cost and excellent for mass production.

When forming grooves, for example, 12 µm in depth for generating dynamic pressure in both flat surfaces of the thrust plate 15 by this kind of coining process, and the thickness of the thrust plate 15 is greater than 2.0 mm, it is not possible to form the grooves without increasing the load for pressing the die and the swaging amount.

When the swaging amount is large, it is easy for the variation in groove depth to become large, and there is a possibility that the variation may exceed 4 µm. However, when the thickness of the thrust plate 15 is 2.0 mm or less (groove depth is 12 µm or less), it is possible to reduce the swaging amount, and thus it is possible to keep the variation of the groove depth up to 4 µm. Furthermore, when the thickness of the thrust plate 15 is 1 mm or less, it is possible to reduce the swaging amount even further, so it is possible to keep the variation in groove depth up to 3 µm, which is preferable. From the aspect of fluid bearing performance, it is desirable at least to keep the variation in groove depth up to 4 µm, so a thrust plate 15 having thickness of 1.5 mm or less is preferable.

On the other hand, a pair of radial-receiving surfaces 13r are formed at intervals in the axial direction on the outer peripheral surface of the shaft 13, and radial-bearing surfaces 12r, which face these radial-receiving surfaces 13r are formed on the inner peripheral surface of the inner sleeve 12A. The radial bearing surfaces 12r are formed with groove 17, for example, herring-bone-shaped in the "<"-shape for generating dynamic pressure, to form radial fluid bearings R.

By arranging the grooves 17 for generating dynamic pressure of the upper radial fluid bearing R such that they are asymmetric with the groove length on the inside being a little shorter than that on the outside, it is possible to prevent the lubricant in the bearing clearance from flowing to the outside during rotation.

The grooves are formed on the inner peripheral surface of the inner sleeve 12A, because the grooves are formed by plastic working such as rolling with halls, which is an excellent method for mass productivity. Ball rolling is a processing method using a rolling jig having a plurality of steel balls held in a hollow outside cylinder fitted around a shaft, in which the rolling jig is pressed against the inner sleeve. In other words, after turning the inner sleeve on a lathe, the herring-bon-shaped ("<"-shaped) grooves are formed on the inner peripheral surface of the inner sleeve by pressing the rolling jig into the inner sleeve while rotating the lathe spindle slowly forward and backward, and then the raised portion on the edges of the grooves are removed when needed by a finishing process such as finishing machining or ball-rolling-through. Of course, it is possible to use a rolling device to press the rolling jig into a fixed sleeve while turning it forward and backward to the left and right, to form an herringbone-shaped groove. Also, it is possible to form the grooves by cutting instead of ball rolling.

The groove 17 for generating dynamic pressure can be formed on the radial-receiving surface 13r or can be formed on both the radial-bearing surface 12r and radial receiving surface 13r.

In order to reduce the torque of the spindle motor, a relief groove 21 is formed on the inner peripheral surface of the inner sleeve 12A in between the upper and lower radial fluid bearings R (or on the outer peripheral surface of the shaft 13 or on both the inner peripheral surface of the inner sleeve 12A and outer peripheral surface of the shaft 13), and it is a circumfcrential groove tapered such that the space becomes more narrow toward the bearing clearance of the radial fluid bearing R.

Moreover, the outer peripheral surface of the inner sleeve 12A, which forms the inner surface of the lubricant reservoir 22, is a tapered surface 24, and this makes the lubricant reservoir 22 gradually become more narrow toward the lower thrust fluid bearing S. Of course, the taper surface 24 is not limited to being formed on the outer peripheral surface of inner sleeve 12A, but could also be formed on the inner peripheral surface of the outer sleeve 12B, or could be formed on both the outer peripheral surface of the inner sleeve 12A and the inner peripheral surface of the outer sleeve 12B.

The section at the bottom of the lubricant reservoir 22 that is closely adjacent to and communicated with the thrust fluid bearing S forms a lubricant-supply path 25 that has a space that is nearly the same or a little larger than the bearing clearance of the thrust fluid bearing S, which by the capillary action due to surface tension, makes it easy for lubricant to reach the bearing clearance.

After assembly is completed, injecting lubricant into the spindle motor is performed from the through hole 26 that is formed throughout in the thickness direction in the center of the bottom plate 12Bb of the outer sleeve 12B. The injected lubricant fills the bearing clearance by surface tension in the thrust fluid bearing S and radial fluid bearings R, and the extra lubricant builds up in the lubricant reservoir 22, and is held by the tapered surface 24 by the capillary action due to surface tension. Also, the lubricant inside the lubricant reservoir 22 does not flow out even when the spindle motor is inverted during shipping and handling.

Moreover, since the width of the lubricant reservoir 22 becomes more narrow toward the lower lubricant-supply path 25 due to the tapered surface 24, as long as the lubricant, even if it is scattered due to external impact, does not flow out, it is naturally collected in the narrow portion of the lubricant reservoir 22 closer to lubricant-supply path 25.

After lubricant has been filled into the spindle motor, a ball 27 is press fitted into the through hole 26 to seal the through hole 26. The ball 27 could also be a cylindrical member or the like.

When the spindle motor is assembled like this, there are few air bubbles remaining in the bearing clearance. In order to completely remove any air bubbles, it is possible to place the spindle motor into a vacuum chamber, if needed, after the lubricant has been injected to remove the air bubbles. In order to prevent the fitted ball 27 from falling out due to impact, or to prevent oil from leaking from gaps the section where the ball 27 is pressed in, it is possible to apply a sheet or adhesive seal (not shown in the figure) to the lower surface of the bottom plate 12Bb of the outer sleeve 12B after the ball 27 has been pressed in.

However, this through hole 26 does not need to be sealed from the aspect of fluid-bearing performance, so after the through hole 26 has been used for injecting the lubricant, it can also be used as an air-release hole. Moreover, injecting lubricant into the spindle motor can also be performed from the air-release hole 23 that is formed on the outer sleeve 12B while the spindle motor is being assembled. In that case, there is no need to form the through hole 26.

The stator 18 is fastened to the outer periphery of the cylindrical section 11a of the base 11, and its peripheral surface faces through a gap the peripheral surface of the rotor magnet 19 that is fastened to the inner peripheral surface of the hub 14, and they form the drive motor M. When this drive motor M rotates the hub 14 and shaft 13 together with the magnetic disk (not shown in the figure) provided around the outer periphery of the hub 14 to be rotated, dynamic pressure is generated in the lubricant that is filled in the bearing clearance of the fluid bearings S, R by the pumping action of the grooves for generating dynamic pressure in both the thrust fluid bearing S and radial fluid bearings R, so that the shaft 13 is supported without coming in contact with the inner sleeve 12A and the bottom plate 12Bb of the outer sleeve 12B. The magnetic disk is fastened for fixing to the threaded hole extending through the shaft 13, using a clamp member by way of screw tightening, so has sufficient strength for withstanding impact.

Thus, the upper end portion of the threaded hole extending through the shaft 13 (the threaded hole portion closer to the opposite shaft end where the thrust plate 15 is mounted) functions as the thread hole for clamping to fix the magnetic disk to the hub, the structure is simple. In addition, due to the threaded hole extending through the shaft 13, chips produced during processing can be easily discharged comparing with the blind hole, and it can be easily washed. Incidentally, although the thread hole for clamping is not necessarily has the same diameter to that of the threaded hole for fixing the thrust plate, the same diameter is better for processing.

Even when there are air bubbles remaining in the bearing clearance, as the bearing rotates, the air is quickly released to the outside through the air-release hole 23 that opens to the lubricant reservoir 22.

When the lubricant that is held in the bearing clearance gradually evaporates or is scattered over a long period of operation and becomes insufficient, the lubricant that is held by the capillary action due to the surface tension inside the lubricant reservoir 22 is drawn in toward the narrow section of the bearing clearance space along the tapered surface 24 corresponding to the insufficient amount of lubricant, and is supplied to the bearing clearance until it is full of lubricant. In other words, as the lubricant in the bearing clearance decreases, lubricant is drawn in along the lubricant-supply path 25 by the capillary action into the narrow portion of the bearing clearance, which is stabilized when the surface tension of the tapered surface 24 of the lubricant reservoir 22 becomes balanced. In this way, the amount that the lubricant is reduced is automatically supplied.

In the spindle motor of this embodiment, the space of the lubricant reservoir 22 is tapered, so lubricant is drawn toward the narrow section of the space by the surface tension, while on the other hand, the remaining air bubbles that were trapped during assembly move to the large section of the space and are discharged. Also, lubricant with no air bubbles is automatically and securely supplied to each of the bearing clearances, and since the bearing clearances are communicated with the lubricant reservoir 22, they are always full of lubricant, and even after a long time of use, reliability is high with excellent durability.

Moreover, in the spindle motor of this embodiment, the sleeve 12 comprises an inner sleeve 12A and outer sleeve 12B, and the bottom plate 12Bb or member (corresponds to the counter plate 6 in the prior example shown in FIG. 2) which faces the bottom surface of the thrust plate 15 to form the thrust fluid bearing S, is integrated with the outer sleeve 12B to form one member. With this kind of construction, the section comprising the sleeve 12, shaft 13 and thrust plate 15 forms a single fluid bearing unit which can be assembled in the spindle motor, thus simplifying the manufacture and assembly of the spindle motor.

Of course, even other construction, such as the example of prior construction shown in FIG. 2, where the sleeve 12 is formed in one member, and the member that faces the bottom surface of the thrust plate 15 to form the thrust fluid bearing S is separate from the sleeve 12, does not interfere at all.

Furthermore, with the spindle motor of this embodiment, the thickness of the thrust plate 15 is thin and up to 1.5 mm, so it is possible to increase the bearing span between the radial fluid bearings R although the overall height is limited, making the moment load capability high. In addition, the thrust plate 15 is fastened by way of screw tightening, and so resistance to impact is high. Moreover, the grooves in the thrust plate 15 for generating dynamic pressure are formed by a coining process, so that the cost of formation is low. Also, the depth of the grooves in the thrust plate 15 for generating dynamic pressure is 12 $\mu$m or less, so that the amount of swaging during the coining process is small, and that it is possible to keep the variation in the groove depth to up to 4 $\mu$m, and thus excellent fluid-bearing performance is obtained.

This embodiment is one example of the present invention, however the invention is not limited to this embodiment. For example, construction of the fluid bearing, construction of the air-release hole 23, construction of or whether or not to have the through hole 26, pattern of the grooves for generating dynamic pressure, detailed construction of the spindle motor, etc. are not limited by this embodiment, and can be changed appropriately as needed.

Moreover, in this embodiment a spindle motor at the fixed-sleeve, rotating-shaft type was explained, however the invention can also be effectively applied to a spindle motor of the rotating-sleeve, fixed-shaft type.

The fluid bearing device of this invention, constructed as described above, increases the load capability for moment loads when the fluid bearing device is swung, is low in cost and is highly reliable, even when the height of the fluid bearing device is limited.

What is claimed is:

1. A fluid bearing device comprising a hollow shaft having a threaded hole extending therethrough and one end formed with a connection portion with a first inner diameter, a thrust plate in a disk shave having a through hole with a second inner diameter, the thrust plate having at least first and second flat surfaces, a first sleeve provided to face the shaft through a radial fluid bearing clearance therebetween, the first sleeve having an end surface which faces the first flat surface of the thrust plate, a second sleeve having a second sleeve flat surface which faces the second flat surface of the thrust plate, wherein a thrust fluid bearing is formed between the end surface of the first sleeve and the first flat surface of the thrust plate and between the second sleeve flat surface and the second flat surface of the thrust plate, and a set screw having a head a cylindrical section with a first outer diameter and a threaded tip portion, wherein the hollow shaft connection portion is being formed in one of convex and concave shapes, and the thrust plate is being guided by the connection portion and the set screw cylindrical section such that the thrust plate it is coaxial with the shaft, and the thrust plate is fixed between the shaft and the set screw through screw-tightening between the threaded hole extending through the shaft and the threaded tip portion of the set screw, and wherein the first inner diameter of the connection portion, second inner diameter of the thrust plate through hole and the inner diameter of the set screw cylindrical section are substantially the same.

2. The fluid bearing device of claim 1, wherein the threaded hole extending through the hollow shaft functions as a thread hole for clamping to fix to the hub an article to be mounted.

3. The fluid bearing device of claim 1, wherein the thrust plate is formed in a disk shape to have a center formed with a through hole, and has a thickness up to 1.5 mm, and the thrust plate has opposite flat surfaces in which grooves for generating dynamic pressure are formed with a depth up to 12 $\mu$m by way of coining process.

4. The fluid bearing device of claim 1, wherein the thrust plate outer diameter is at least as large as an outer diameter of the first sleeve end surface.

* * * * *